(No Model.)
A. J. OBRIST.
THILL COUPLING.
No. 495,362. Patented Apr. 11, 1893.
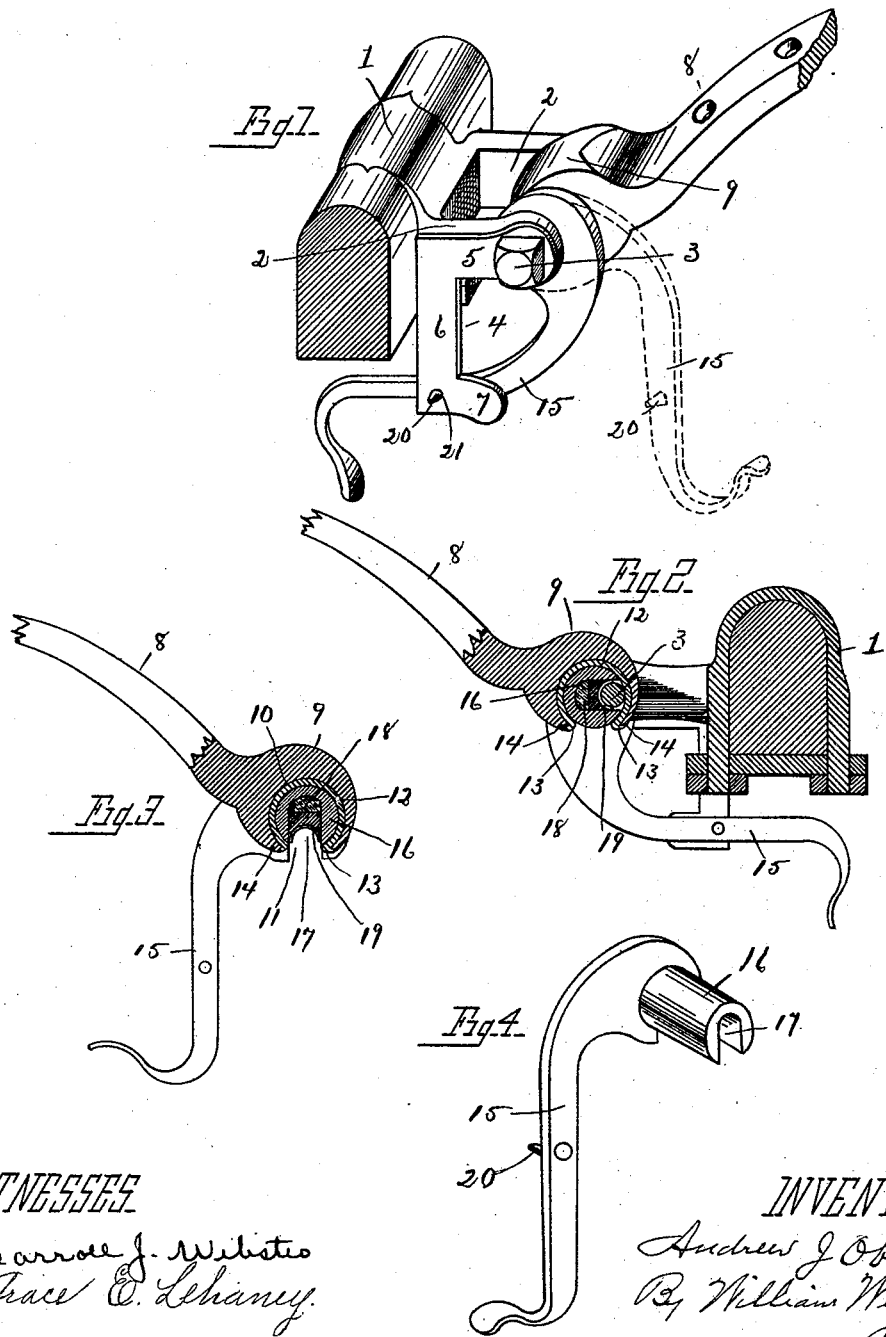
WITNESSES
Carroll J. Webster
Grace E. Lehaney.
INVENTOR
Andrew J. Obrist
By William Webster
Atty

UNITED STATES PATENT OFFICE.

ANDREW J. OBRIST, OF DEFIANCE, OHIO, ASSIGNOR TO HIMSELF, FRANK H. ROHN, AND HARRY E. BROWN, OF SAME PLACE.

THILL-COUPLING.

SPECIFICATION forming part of Letters Patent No. 495,362, dated April 11, 1893.

Application filed August 20, 1892. Serial No. 443,597. (No model.)

*To all whom it may concern:*

Be it known that I, ANDREW J. OBRIST, of Defiance, county of Defiance, and State of Ohio, have invented certain new and useful Improvements in Thill-Couplings; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a thill coupling, and has for its object to construct a coupling that shall be easily attached or detached from the drawiron upon the axle, with means for locking the parts when assembled.

A further object is to construct a coupling for the thills, that shall be attachable to the ordinary axle clip in present use, thereby dispensing with the usual expense of an especially constructed clip, and drawiron.

The invention consists in the parts and combination of parts hereinafter described and pointed out in the claims.

In the drawings: Figure 1 is a side elevation of a complete coupling shown as attached to an ordinary axle clip, showing in full lines the lever depressed, and in dotted lines the lever raised to detach the coupling from the clip. Fig. 2 is a transverse sectional view of the same with the position of the axle, clip, and coupling reversed to disclose the interior of the coupling when the lever is locked. Fig. 3 is a sectional detail view of the coupling removed from the clip, showing the position of the parts, when in condition to be attached to the clip. Fig. 4 is an elevation of the lever, and locking cylinder.

1 designates the axle clip formed with the drawirons 2 and draw bolt 3.

4 designates a spring catch comprising a right angled arm perforated at the end of the horizontal portion 5 to receive the bolt 3, the vertical portion 6 bearing against the forward side of the axle to hold the catch in fixed position, and the right angled thumb plate 7 by which to spring the catch.

8 designates the drawiron of the thill formed with an enlargement 9 at the coupling end, into which is formed a circular recess 10, the wall of which is cut away to form a slot 11 opening into the same.

12 designates a wearing plate of circular form to fit closely within the recess 10, and secured therein by reason of the edges 13 of the plate being turned upon the edges 14 of the wall of the recess. Plate 12 is formed of steel, bronze, or other analogous anti-frictional material.

15 designates a lever formed integral with a locking cylinder 16 having a peripheral slot 17 of the same area as slot 11, the cylinder being of a diameter to closely fit within plate 12.

To assemble the parts a packing of rubber or other compressible substance 18 is inserted into slot 17, of the cylinder 16, a bearing 19 is placed upon the packing and the cylinder is inserted into the wearing plate 12, or recess 10 if the plate is not employed, lever 15 is moved to cause the slot in the cylinder to coincide with the slot in the bearing plate as shown in Fig. 3, the coupling is engaged with the bolt 3 by simply causing the same to enter the slots and contact with bearing plate 19, when lever 15 is moved downward thereby revolving the cylinder, and moving the slotted portion of the same out of coincidence with the slot in the bearing plate, and the parts are firmly coupled together without the possibility of rattling as the bearing plate is urged firmly against the compressible packing to a degree to compensate for wear or jarring.

In order to lock the lever when the parts are coupled, and thereby preclude the possibility of the parts becoming detached there is a pin 20 upon lever 15 which rides up the thumb plate 7 as the lever is being depressed causing a vertical portion 6 of the catches 4 to spring outwardly, to allow pin 20 to enter a perforation 21 in the vertical portion of the spring catch 4, and the lever is locked.

In order to uncouple the thill irons from the clip the spring catch 4 is sprung outward by pressing upon the thumb plate, the pin is released and the lever raised until the slots are in coincidence when the thills or pole is raised to withdraw bolt 3 from the slot.

It will be seen that the coupling is inexpensive of construction, firmly locked when assembled with the clip bolt, and easily uncoupled as well as providing against rattling of the parts.

What I claim is—

1. In a thill coupling, a thill iron formed with a circular recess, the wall of which is provided with a slot, a slotted cylinder within the recess, a lever integral therewith, and an axle clip having a drawbolt.

2. In a thill coupling, a thill iron formed with a circular recess, the wall of which is provided with a slot, a circular wearing plate secured in the recess, a cylinder journaled in the wearing plate having an axial slot, a compressible packing within the slot, a bearing plate upon the packing a lever integral with the cylinder and an axle clip having a draw bolt.

3. In a thill coupling, an axle clip having a draw bolt, a thill iron having a recess, the walls of which are provided with a slot, a slotted cylinder within the recess a lever integral with the cylinder, a pin upon the lever and a catch upon the clip having a perforation adapted to receive the pin and lock the lever.

In testimony that I claim the foregoing as my own I hereby affix my signature in presence of two witnesses.

ANDREW J. OBRIST.

Witnesses:
ELMER L. CARPENTER,
JAY. WEISENBURGER.